United States Patent
Hawkins et al.

(10) Patent No.: US 8,375,094 B2
(45) Date of Patent: Feb. 12, 2013

(54) CREATING A MESSAGE READABLE BY A PLURALITY OF HETEROGENEOUS RECIPIENTS

(75) Inventors: John Christopher Hawkins, Southampton (GB); David John Vines, Romsey (GB)

(73) Assignee: International Business Machines Corporation, Armonk, NY (US)

( * ) Notice: Subject to any disclaimer, the term of this patent is extended or adjusted under 35 U.S.C. 154(b) by 386 days.

(21) Appl. No.: 12/610,820

(22) Filed: Nov. 2, 2009

(65) Prior Publication Data

US 2010/0115041 A1    May 6, 2010

(30) Foreign Application Priority Data

Nov. 3, 2008 (EP) .................................. 08168185

(51) Int. Cl.
*G06F 15/16* (2006.01)

(52) U.S. Cl. ........ 709/206; 709/201; 709/202; 709/231; 709/234

(58) Field of Classification Search .................. 709/206, 709/201, 202, 231, 234
See application file for complete search history.

(56) References Cited

U.S. PATENT DOCUMENTS

| | | | |
|---|---|---|---|
| 7,131,116 B1* | 10/2006 | Krishna | 717/136 |
| 2004/0131082 A1* | 7/2004 | Evans et al. | 370/469 |
| 2010/0093441 A1* | 4/2010 | Rajaraman et al. | 463/42 |

* cited by examiner

*Primary Examiner* — Lan-Dai T Truong
(74) *Attorney, Agent, or Firm* — Steven L. Nichols; Van Cott, Bagley, Cornwall & McCarthy P.C.

(57) ABSTRACT

Transforming an original message from an application executed by a physical computing device to create a message readable by a plurality of heterogeneous recipients includes: creating with the physical computing device a first sub-message having data from the original message that is readable by each of the heterogeneous recipients; creating with the physical computing device a second sub-message having data from the original message that is not readable by each of the heterogeneous recipients; and generating with the physical computing device a composite message including both the first sub-message and the second sub-message.

20 Claims, 8 Drawing Sheets

CREATING A MESSAGE READABLE BY A PLURALITY OF HETEROGENEOUS RECIPIENTS

CROSS-REFERENCE TO RELATED APPLICATIONS

The present application claims priority pursuant to 35 U.S.C. §119(a) from Great Britain Patent Application No. 08168185.0, which was filed on Nov. 3, 2008 and is incorporated herein by reference in its entirety.

BACKGROUND

Aspects of the present invention relate to the use of Message Oriented Middleware to transmit messages between two or more application programs.

In recent years, the development of Message Oriented Middleware (MOM) has enhanced the ability of application programs to communicate with each other or with system provided services in a computer system or network. MOM allows such communication to occur without the sending or receiving application program having to become involved in the complexities of particular operating systems or communication protocols.

MOM typically includes software that provides a common programming interface by means of which applications can communicate with other applications without specific knowledge of the different operating systems and protocols which may be used by those applications.

BRIEF SUMMARY

Transforming an original message from an application executed by a physical computing device to create a message readable by a plurality of heterogeneous recipients includes: creating with the physical computing device a first sub-message having data from the original message that is readable by each of the heterogeneous recipients; creating with the physical computing device a second sub-message having data from the original message that is not readable by each of the heterogeneous recipients; and generating with the physical computing device a composite message including both the first sub-message and the second sub-message.

A data processing system includes a processor and a memory communicatively coupled to the processor. The memory includes code executable by the processor to implement a computer application and a Message Oriented Middleware (MOM) interface application. The processor is configured to, responsive to the computer application producing an original message according to a first MOM format and intended for multiple heterogeneous recipients, execute the MOM interface application to: place any portion of the original message that is compatible with each of the heterogeneous recipients into a first sub-message such that the first sub-message is pareseable by MOM of each of said heterogeneous recipients; place any portion of the original message that is not compatible with each of the heterogeneous recipients into a second sub-message such that the second sub-message is parseable by MOM of at least one of the heterogeneous recipients; and generate a composite message including both the first sub-message and the second sub-message.

A computer program product for transforming an original message into a message readable by multiple heterogeneous recipients includes: a computer readable storage medium having computer readable program code embodied therewith, the computer readable program code including: computer readable program code configured to create a first sub-message comprising data from the original message that is readable by each of the heterogeneous recipients; computer readable program code configured to create a second sub-message comprising data from the original message that is readable by only some of the heterogeneous recipients; and computer readable program code configured to generate a composite message including both the first sub-message and the second sub-message.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

The present specification discloses methods, apparatus, and computer program products for transforming at least a message sent by a first entity to a form that can be recognized by multiple heterogeneous receiving entities, thereby facilitating interoperability between the sending and receiving entities.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
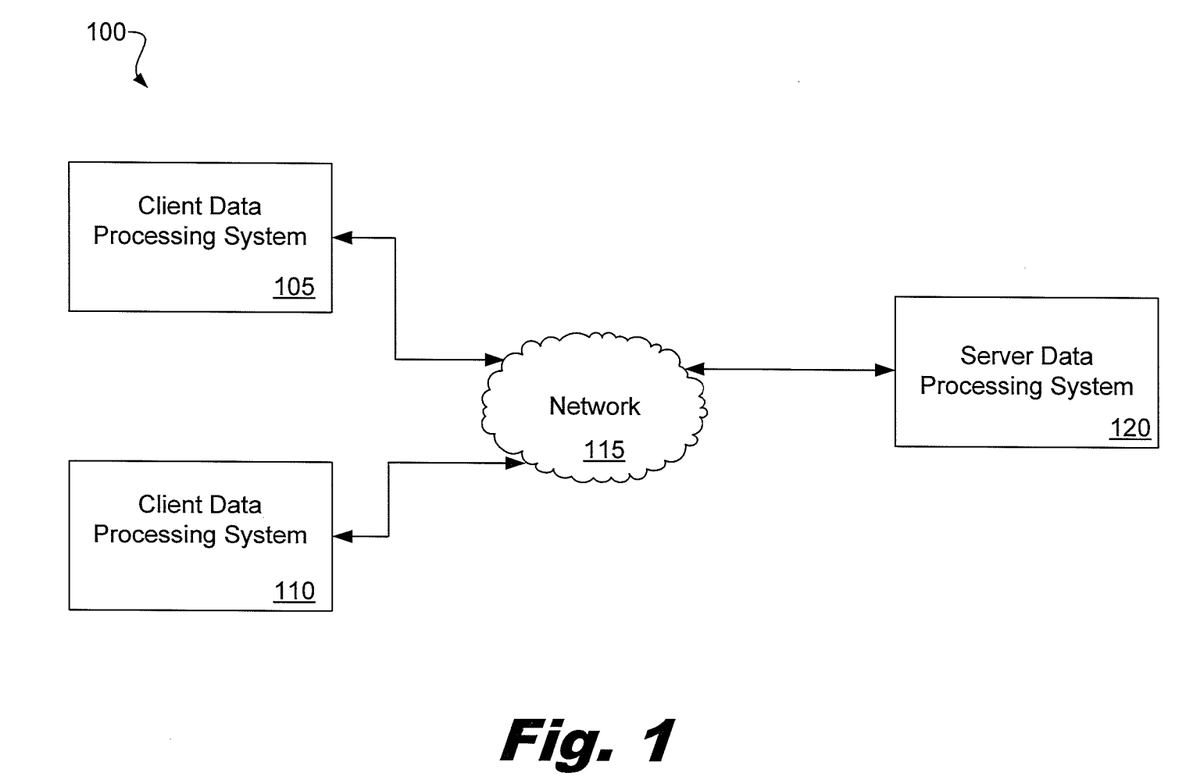
FIG. 1 is a block diagram of components in an illustrative data processing environment, according to one exemplary embodiment of principles described herein.

FIG. 1 is a block diagram showing components of a typical data processing environment (100) in which a preferred embodiment of the present invention may be embodied. The data processing environment (100) typically includes a plurality of client data processing systems (105, 110) operable to connect to a server data processing system (120) using a network (115). A client data processing system (105, 110) can take the form of a computer, a mobile phone, a Personal Digital Assistant (PDA) etc.

A client data processing system (105, 110) can send requests for resources (e.g. a request for a web page) using the network (115) to the server data processing system (120). The server data processing system (120) stores or has access to resources which can be accessed by the client data processing system (105, 110). The server data processing system (120) includes one or more applications operable to respond by serving a resource to a request from a client data processing system (105, 110).

Figure 2:
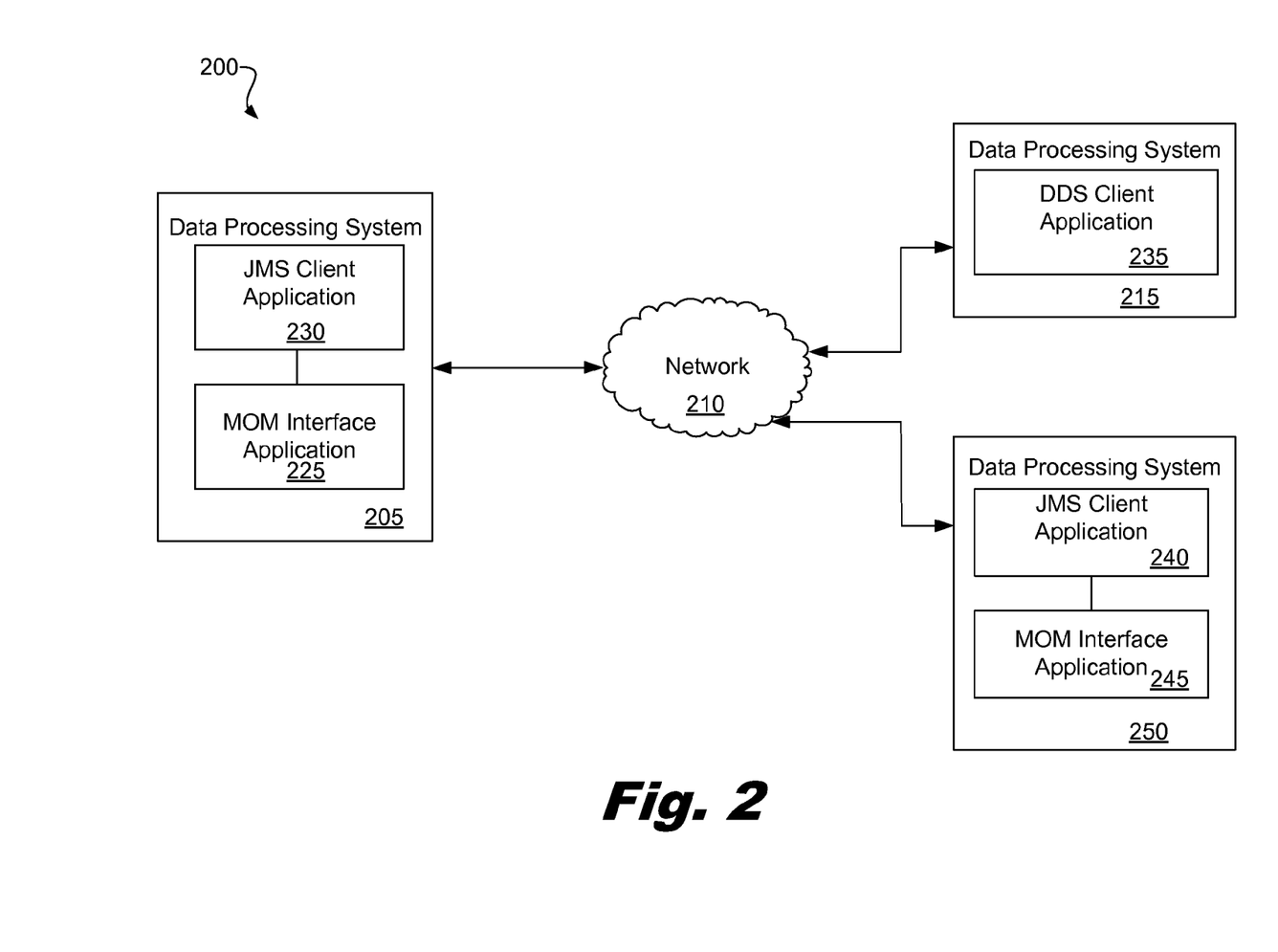
FIG. 2 is a block diagram of components in an illustrative data processing environment according to one exemplary embodiment of principles described herein.

FIG. 2 is a block diagram of a data processing system (200) according to a preferred embodiment of the present invention. In the example herein, a first data processing system (205) includes a JMS client application (230). In the example herein, the JMS client application (230) is associated with Java™ Message Service (JMS) which is a Java MOM (Java and all Java-based trademarks and logos are trademarks of Sun Microsystems, Inc. in the United States, other countries, or both).

A JMS message typically includes a header, one or more properties and a message body. The message body typically allows a plurality of types of message to be created. One such message type is a JMS "map" message which includes a map of name/value pairs. In the example herein, the first data processing system (205) also includes a MOM interface application (225) operable to communicate with the JMS client application (230).

The data processing environment (200) also includes a second data processing system (215) including a DDS client application (235) wherein the DDS client application (235) is associated with a Data Distribution Service (DDS). In the example herein, the first data processing system (205) is operable to generate a DDS message. A DDS message typically includes a plurality of sub-messages types. An example of a sub-message type is one that can include a message body.

A schema associated with an Interface Definition Language (IDL) is used to specify the format of the data in the message body that is expected by a DDS client. The DDS client is operable to understand the data in a sub-message by using such an IDL schema.

Furthermore, the data can be constructed using, e.g., the Common Data Representation (CDR) mechanism such that a data stream having a sequential order is constructed. Typically, the Real-Time Publish-Subscribe (RTPS) protocol is used by DDS clients. In order to interact with a DDS client, one or more specifications of e.g. the RTPS protocol must be followed. Typically, DDS allows the specification of one or more sub-messages types which are unrecognizable by a DDS client such that a sub-message can be used for e.g. provider specific information such as security data. If a DDS client receives a sub-message of such a sub-message type, the DDS client is operable to ignore the sub-message as described in "The Real-time Publish-Subscribe Wire Protocol DDS Interoperability Wire Protocol Specification" dated 7 Jun. 2003. The preferred embodiment exploits this mechanism as will be detailed herein and in the example herein.

In certain embodiments, a publish/subscribe messaging model may be used by the JMS client application (230) of the first data processing system (205); the MOM interface application (225) associated with the JMS client application (230) of the first data processing system (205); and the DDS client application (235). Publish and Subscribe (pub/sub) is an effective way of disseminating information to multiple users. In a pub/sub system, "publishers" generate messages and "subscribers" can receive messages.

In the example herein, a publisher sends a published message in a multicast fashion to subscribers. Each subscriber determines whether it is interested in the published message (e.g. by using an identifier associated with the message)—if a subscriber is interested in the message, it processes the message and if a subscriber is not interested in the message, it discards the message.

The data processing environment (200) also includes a third data processing system (250) including a JMS client application (240) and a MOM interface application (245) operable to communicate with the JMS client application (240). In certain embodiments, a publish/subscribe messaging model may be used by the JMS client application (240) of the third data processing system (250) and the MOM interface application (245) associated therewith. Additionally, each of the data processing systems (205, 215 and 250) may use RTPS to communicate with the network (210).

Figure 3A:
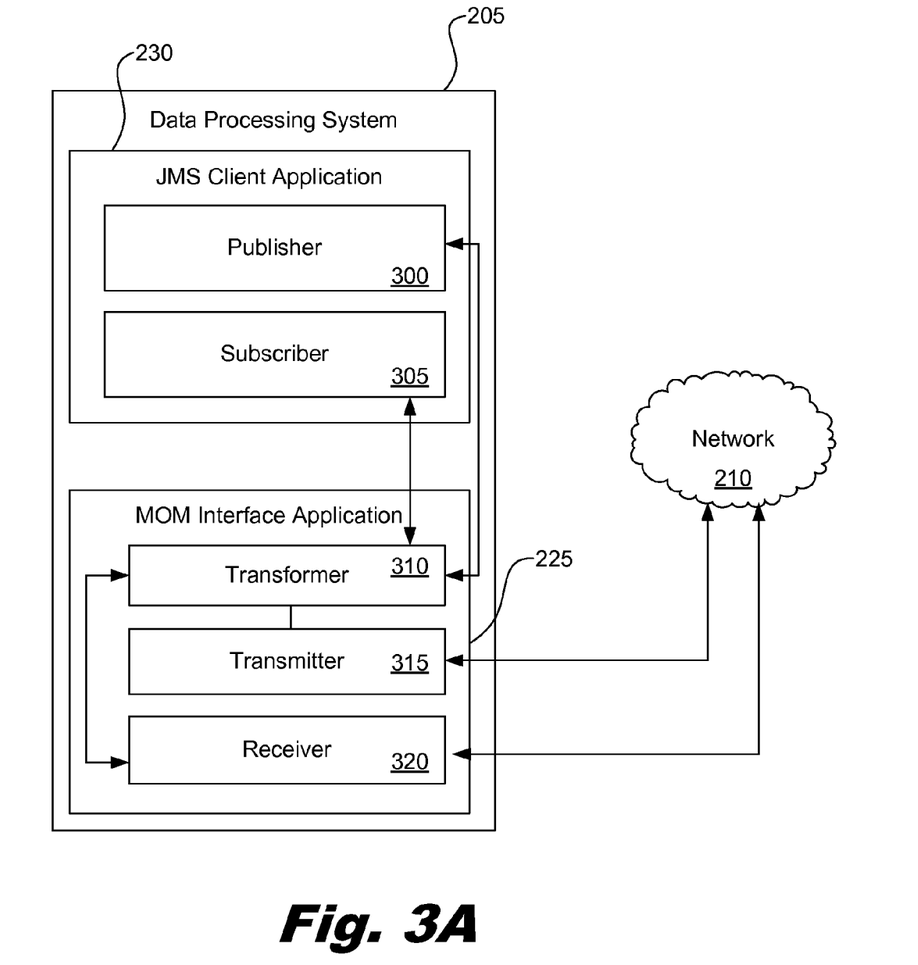
FIG. 3A is a block diagram of an illustrative data processing system according to one exemplary embodiment of principles described herein.

FIG. 3A is a block diagram depicting in more detail the JMS client application (230) and the MOM interface application (225) of the first data processing system (205) in the illustrative environment of FIG. 2.

The JMS client application (230) of the first data processing system (205) includes a first publisher (300) which is operable to generate a JMS message and a first subscriber (305) which is operable to receive a JMS message. The MOM interface application (225) associated with the JMS client application (230) of the first data processing system (205) includes a first transformer (310) for transforming a DDS message into a JMS message and for transforming a JMS message into a DDS message. The first transformer (310) is operable to communicate with the JMS client application (230); a first transmitter (315) and a first receiver (320). Each of the first transmitter (315) and the first receiver (320) is operable to communicate with the network (210). The first receiver (320) is operable to register a subscription with a publisher on behalf of the first subscriber (305).

Figure 3B:
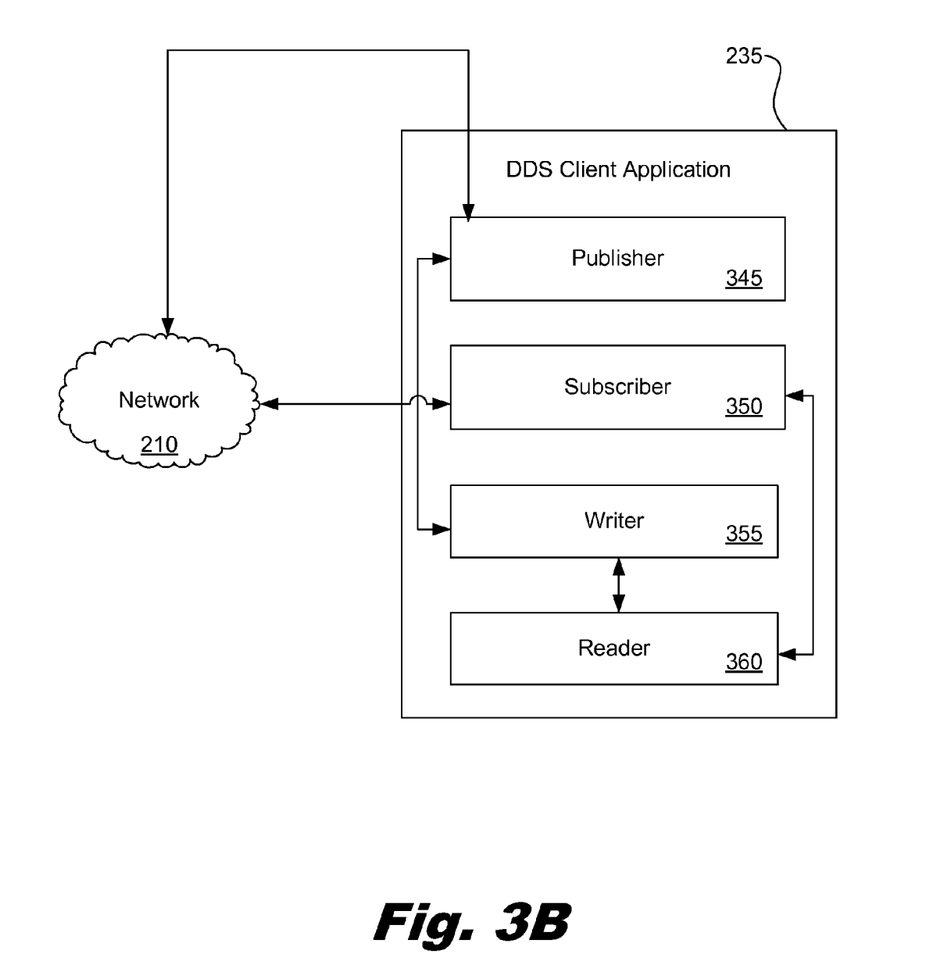
FIG. 3B is a block diagram of an illustrative data processing system according to one exemplary embodiment of principles described herein.

FIG. 3B is a block diagram depicting in more detail the DDS client application (235) of the second data processing system (235) of the illustrative environment shown in FIG. 2. The DDS client application (235) includes a second publisher (345) which publishes a DDS message; a second subscriber (350) which receives a DDS message; a writer (355) which generates a DDS message and a reader (360) which registers a subscription with the matching engine (210) and reads the DDS message received by the second subscriber (350). The second publisher (345) and the second subscriber (350) are operable to communicate with the network (210). In a preferred implementation, the second publisher (345); the second subscriber (350); the writer (355) and the reader (360) are implemented as object-oriented objects.

Figure 3C:
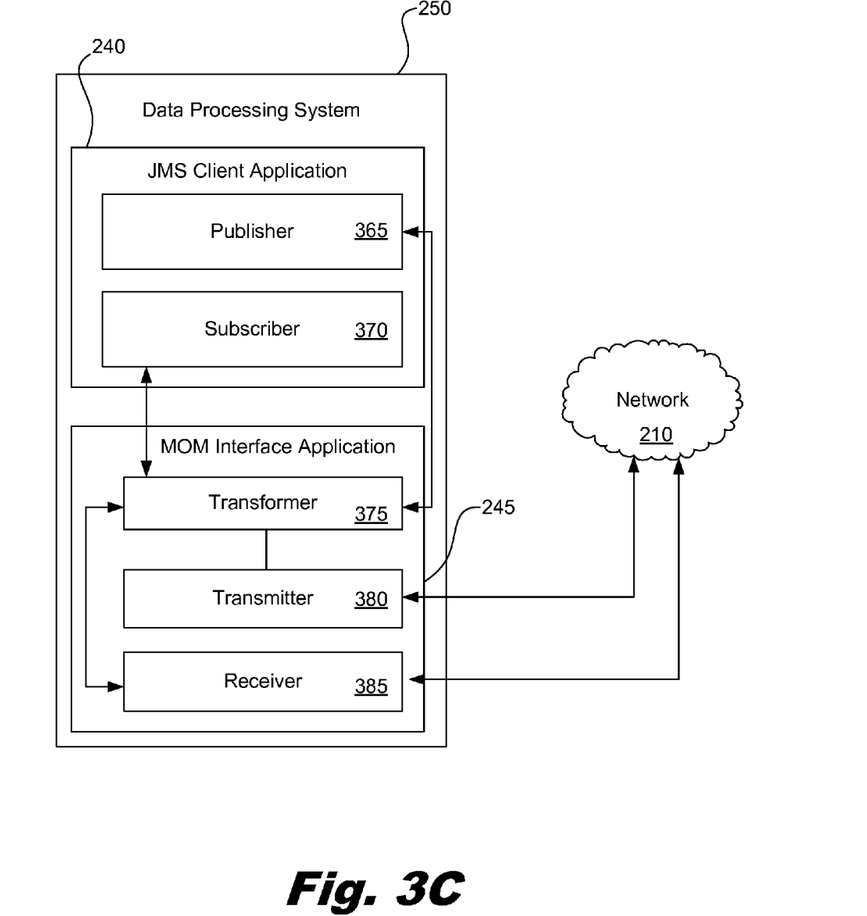
FIG. 3C is a block diagram of an illustrative data processing system according to one exemplary embodiment of principles described herein.

FIG. 3C is a block diagram depicting in more detail the JMS client application (240) and the MOM interface application (245) of the third data processing system (250) from the environment of FIG. 2. The JMS client application (240) includes a third publisher (365) which is operable to generate a JMS message, and a third subscriber (370) which is operable to receive a JMS message. The MOM interface application (245) also includes a second transformer (375) for transforming a DDS message into a JMS message and for transforming a JMS message into a DDS message.

The second transformer (375) is operable to communicate with the JMS client application (240); a second transmitter (380) and a second receiver (385). Each of the second transmitter (380) and the second receiver (385) is operable to communicate with the network (210). The second receiver (385) is operable to register a subscription with a publisher on behalf of the third subscriber (370).

Figure 4:
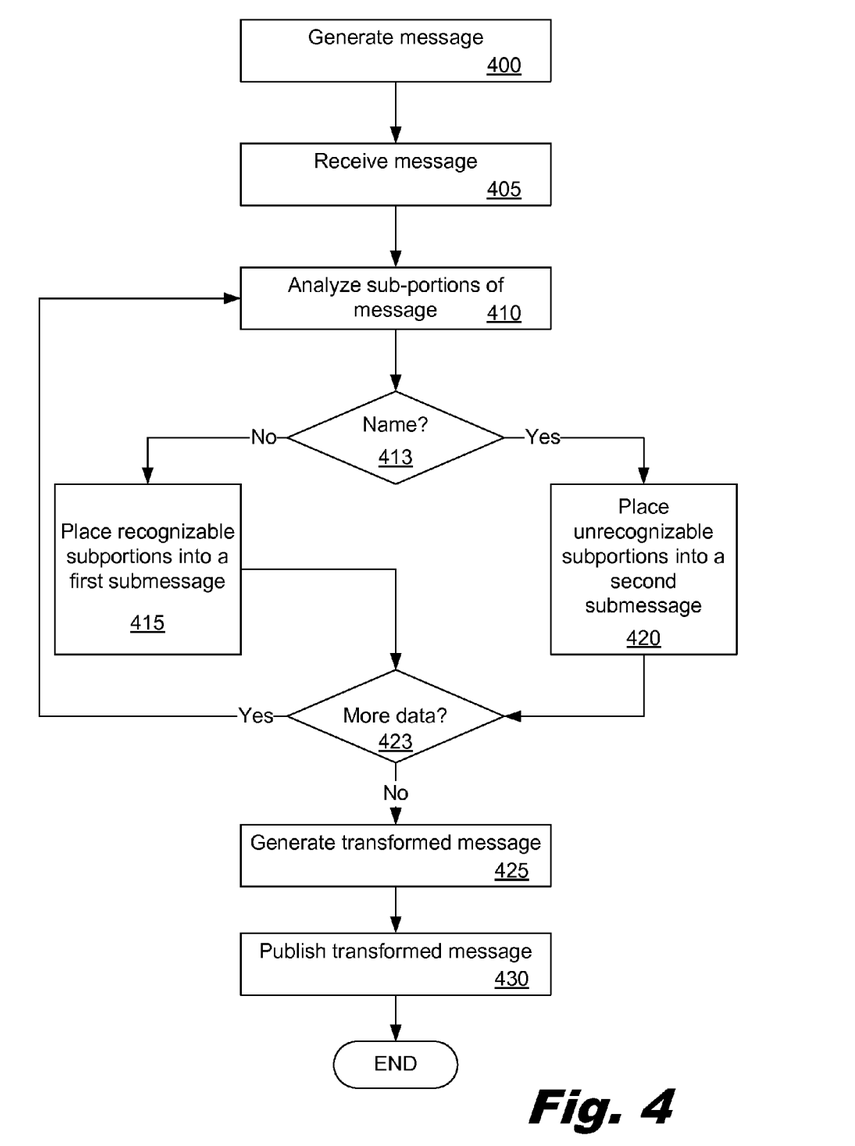
FIG. 4 is a flow chart diagram of an illustrative Message Oriented Middleware process according to one exemplary embodiment of principles described herein.

FIG. 4 depicts a flow chart showing the operational steps involved in an illustrative process according to one embodiment of the principles described herein. At step 400, the first publisher (300) generates a JMS message. In one example, a representation of the JMS message is depicted below, wherein the JMS message includes a header and a message body. The message header is not detailed herein:

| Message body: | |
|---|---|
| Name | Value |
| "Price" | new Integer (8496) |
| "Symbol" | "IBM" |
| "Timestamp" | new Long (1224686640000) |

The JMS message depicted is associated with a JMS "map" message wherein the message body includes a map of name/value pairs such that a name is associated with a value. For example, a name "Price" is associated with an integer value "new Integer (8496)"; a name "Symbol" is associated with a string value "IBM"; a name "Timestamp" is associated with a long value "new Long (1224686640000)".

The JMS message body represents an example quote of 8496 cents for IBM's stock at 15:44 on 22 Oct. 2008. The publisher (300) in the JMS client application (230) of the first data processing system (205) sends the JMS message to the first transformer (310) of the associated MOM interface application (225) which receives (step 405) the JMS message. The first transformer (310) analyses (step 410) the received JMS message. The first transformer (310) analyses the received JMS message in order to create a DDS message that can subsequently be sent to a DDS client (namely, the DDS client application (235)). It should be understood that currently, a JMS "map" message cannot be sent to a DDS client.

In certain embodiments, the first transformer (310) analyses the received JMS message to create a DDS sub-message associated with the JMS message body As stated above, a DDS client is operable to understand the data in a sub-message by using an IDL schema (e.g. for a particular topic). In the example herein, a representation of the IDL schema is shown below:

```
struct TickerMessage {
    long Price;
    String Symbol;
    long long Timestamp;
}
```

In the example herein, a sub-message contains (as defined by CDR):

4 bytes (interpreted as a signed integer);

4 bytes (interpreted as an unsigned integer and including the length of the following string);

0-n bytes (interpreted as a string);

0-n bytes (padding bytes for padding to an 8 byte boundary); and 8 bytes (interpreted as a signed integer)

Note that the names (e.g. "Price", "Symbol" and "Timestamp") do not appear in the CDR.

It should be understood that a DDS client is configured using the IDL schema which is a fixed structure and hence there is no need for the names of fields to appear in the CDR. That is, in a DDS message, names of fields should not appear as they will not be recognized and would interfere with the interpretation of the DDS message. In other words, names of fields are an example of data that is incompatible with a DDS client.

Because the CDR definition includes no information associated with the names, the preferred embodiment exploits this. The first transformer (310) may be configured to analyze a name in the map of name/value pairs; place the name in a first sub-message having a sub-message type which a DDS client does not recognize and is therefore operable to ignore; determine the associated value using the map and place the value in a second sub-message having a sub-message type which a DDS client is operable to recognize. This will be described in more detail herein.

At step 410, the first transformer (310) checks the first name in the map, namely, "Price". As "Price" is a name (positive result to step 413), the first transformer (310) writes (step 415) the name "Price" in a first sub-message. As there is more data in the map to be analyzed, at step 410, the first transformer (310) checks the next portion of data in the map, namely the value associated with "Price". As "new integer (8496)" is a value (negative result to step 413), the first transformer (310) writes (step 420) the value "new integer (8496)" in a second sub-message.

As there is more data in the map to be analyzed (positive result to step 423), at step 410, the first transformer (310) checks the next portion of data in the map, namely the name "Symbol". As "Symbol" is a name (positive result to step 413), the first transformer (310) writes (step 415) the name "Symbol" in the first sub-message.

As there is more data in the map to be analyzed (positive result to step 423), at step 410, the first transformer (310) checks the next portion of data in the map, namely the value associated with "Symbol". As "IBM" is a value (negative result to step 413), the first transformer (310) writes (step 420) the value "IBM" in the second sub-message.

As there is more data in the map to be analyzed (positive result to step 423), at step 410, the first transformer (310) checks the next portion of data in the map, namely the name "Timestamp". As "Timestamp" is a name (positive result to step 413), the first transformer (310) writes (step 415) the name "Timestamp" in the first sub-message.

As there is more data in the map to be analyzed (positive result to step 423), at step 410, the first transformer (310) checks the next portion of data in the map, namely the value associated with "Timestamp". As "1224686640000" is a value (negative result to step 413), the first transformer (310) writes (step 420) the value "1224686640000" in the second sub-message.

Note that the first sub-message has a sub-message type which a DDS client does not recognize and which it is therefore operable to ignore (as described above). Note also that the second sub-message has a sub-message type (e.g. a "DATA" sub-message) which a DDS client is operable to recognize.

Preferably, the first transformer (310) uses CDR to write the names and values.

Preferably, the first sub-message includes the names and types of the contents of the map. An example of the representation of an IDL schema for the first sub-message is shown below:

```
struct NAME {
    TCKind typecode;
    string name;
}
typedef sequence<NAME> NAMES;
```

The first portion above, namely "struct NAME {TCKind typecode; string name;}" defines a structure called NAME including two portions called "typecode" and "name".

The "typecode" is of type TCKind and the type is defined by the CORBA 2.3 specification as an enum. This enum can take one of several values, each of which indicates a different type (e.g. tk_short for a two byte signed integer, tk_long for a four byte signed integer, tk_boolean for a boolean, tk_string for a string and tk_longlong for an eight byte integer, tk_wstring for a string with "wide" characters in it (e.g. UTF-16)).

The second portion above, namely "typedef sequence<NAME>NAMES;" defines a new type called "NAMES" which is a sequence of "NAME".

Using the schema, a representation of a first sub-message is shown in Table 1 below. The data in the "data" column has been encoded using hex and CDR (associated with the CORBA 2.3 specification):

TABLE 1

| Offset | Data |
|---|---|
| 00000000 | 00000000 00000003 00000003 00000006 |
| 00000010 | 50726963 65000000 0000001B 00000007 |
| 00000020 | 53796D62 6F6C0000 00000017 0000000A |
| 00000030 | 54696D65 7374616D 7000 |

Details associated with interpretation of the first sub-message are given in Table 2 below:

TABLE 2

| Offset | Data | Comments |
|---|---|---|
| 0 | 00000000 | CDR_BE Big Endian Mark (as defined by the RTPS specification) |
| 4 | 00000003 | The number of names |
| 8 | 00000003 | The type of the first value (i.e. long) |
| 12 | 00000006 | String length |
| 16 | 50726963 6500 | The bytes of the string (the first name) |
| 22 | 0000 | Padding bytes for padding to a 4 byte boundary ignoring the Big Endian mark) |
| 28 | 00000007 | String length |

TABLE 2-continued

| Offset | Data | Comments |
|---|---|---|
| 32 | 53796D62 6F6C00 | The bytes of the string (the second name) |
| 39 | 00 | Padding byte for padding to a 4 byte boundary ignoring the Big Endian mark |
| 40 | 00000017 | The type of the third value (i.e. long long) |
| 44 | 0000000A | String length |
| 48 | 54696D65 7374616D 7000 | The bytes of the string (the third name) |

A representation of the second sub-message according to certain embodiments is shown in Table 3 below. The data in the "data" column has been encoded using hex and CDR (associated with the CORBA 2.3 specification):

TABLE 3

| Offset | Data |
|---|---|
| 00000000 | 00000000 00002130 00000003 49424D00 |
| 00000010 | 00000000 0000011D 25031B80 |

Details associated with interpretation of the second sub-message are given in Table 4 below:

TABLE 4

| Offset | Data | Comments |
|---|---|---|
| 0 | 00000000 | CDR_BE Big Endian Mark (as defined by the RTPS specification) |
| 4 | 00002130 | A long (namely a 32 bit integer representing a value for Price) |
| 8 | 00000004 | String length (Symbol) |
| 12 | 49424D00 | The bytes representing the value of the string |
| 16 | 00000000 | Padding bytes for padding to an 8 byte boundary ignoring the Big Endian mark |
| 20 | 0000011D 25031B80 | A long long (namely a 64 bit integer representing a value for Timestamp) |

The names may be written in the first sub-message in the same order as specified by the annotated IDL schema (namely, firstly "Price" is written, subsequently "Symbol" is written and subsequently "Timestamp" is written). Alternatively, the values may be written in the second sub-message as specified by the annotated IDL schema, (namely, the value for "Price" is written as an integer value, the value for "Symbol" is written as a string value and the value for "Timestamp" is written as a long value).

In certain embodiments, there may be a need to write the values in the second sub-message in a specified order such that the values can be mapped to the appropriate names. In another example, the values can be written in an order associated with an alphabetic order of the associated names—e.g. firstly the value for "Price" is written in the second sub-message; subsequently the value for "Symbol" is written in the second sub-message and subsequently the value for "Timestamp" is written in the second sub-message.

In another example, the values can be written in an order that is associated with a temporal order by which the name/value pairs were initially mapped in the JMS message. The inventors have noted that using a temporal order requires a modification of the way in which JMS map messages are typically implemented—e.g. a modification whereby the first transformer (310) is required to remember the temporal order.

In certain embodiments, at step 423, as there is no more data in the map to be analyzed (negative result to step 423), at step 425, a DDS message including the first sub-message and the second sub-message may be generated by the first transformer (310).

The first transformer (310) passes the DDS message to the first transmitter (315) which publishes (step 430) the DDS message (using a topic string associated with the DDS message) in a multicast fashion to a list of subscribers (namely, the DDS client application (235) and the MOM interface application (245) associated with the JMS client application (240) of the third data processing system (250)).

Figure 5:
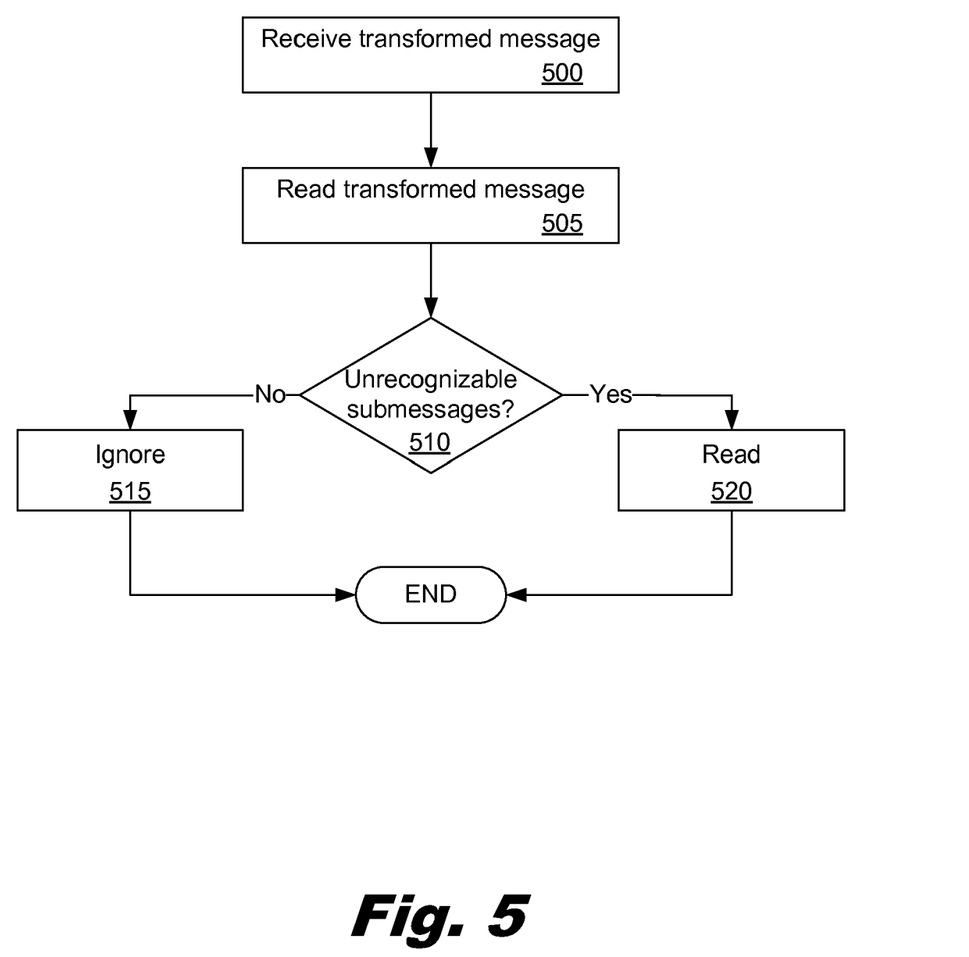
FIG. 5 is a flow chart diagram of a process performed by a recipient of a message from Message Oriented Middleware according to one exemplary embodiment of the principles described herein.

With reference to FIG. 5, at step 500, the second subscriber (350) of the DDS client application (235) receives the published DDS message. At step 505, the reader (360) "reads" the DDS message received by the second subscriber (350). In the example herein, the reader (360) reads a type of each sub-message of the DDS message and determines (step 510) whether the sub-message is of a type that is recognizable.

In the example herein, the reader (360) reads the first sub-message type and determines that the sub-message type is not recognizable (positive outcome to step 510) by a DDS client (e.g. the DDS client application (235)). In response, at step 515, the reader (360) ignores the first sub-message. Subsequently, the first sub-message is discarded (e.g. as required by the RTPS specification).

In the example herein, the reader (360) reads the second sub-message and determines that the second sub-message has a sub-message type which is recognizable (negative outcome to step 510) by a DDS client (e.g. the DDS client application (235)). In response, at step 520 the reader (360) reads data in the second sub-message and interprets the second sub-message as detailed in Table 4. Subsequently, the data can be used by another application to e.g. display the stock price in a ticker.

Figure 6:
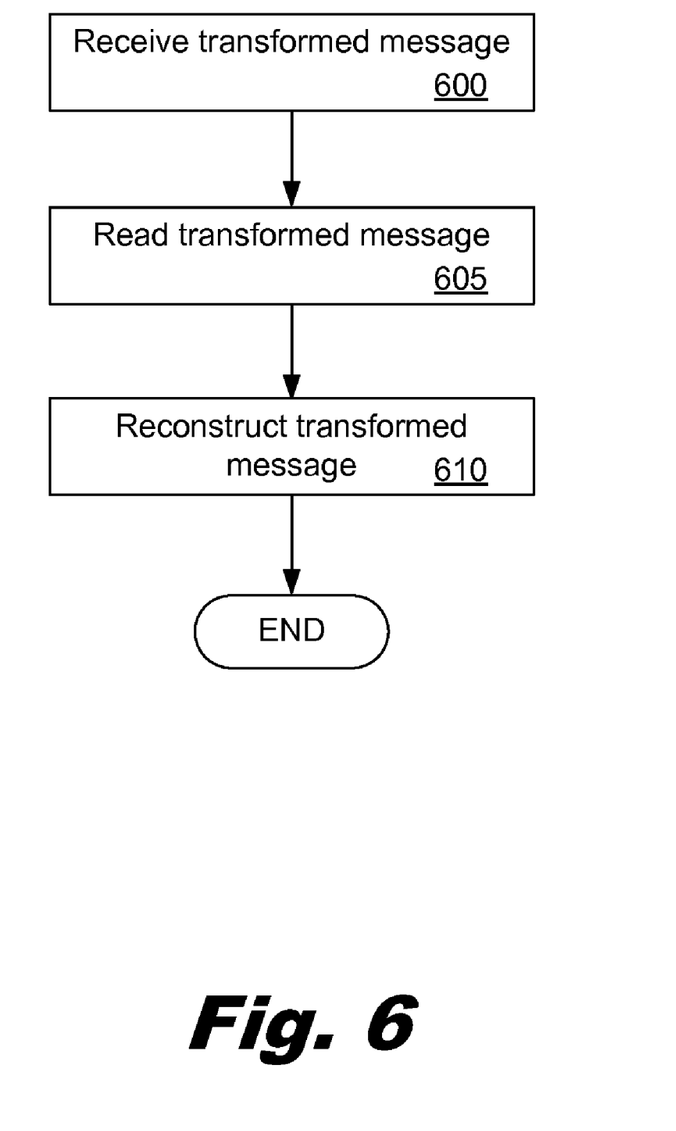
FIG. 6 is a flow chart diagram of an illustrative process performed by a recipient of a message from Message Oriented Middleware according to one exemplary embodiment of the principles described herein.

With reference to FIG. 6, the second receiver (385) of the MOM interface application (245) associated with the JMS client application (240) of the third data processing system (250) also receives (step 600) the published DDS message. The second receiver (385) passes the published DDS message to the second transformer (375). In response, the second transformer (375) reads (step 605) the first sub-message.

In certain embodiments, the second transformer (375) may use a typecode in order to determine a type of a value in the first sub-message (e.g. long). The second transformer (375) subsequently may also string length and bytes of a string to read e.g. the first name.

The second transformer (375) generates a JMS map message and adds the name that has been read to the generated JMS map message. In certain embodiments, the second transformer (375) reads the second sub-message (as described in Tables 3 and 4) in order to determine the value associated with the name. In response, the second transformer (375) adds the value to the generated JMS map message and associates the value with the name. Note that the value was added to the second sub-message according to a particular order.

In certain embodiments, the second transformer (375) reads each of the names from the first sub-message; each of the values from the second sub-message and adds the names and associated values to the generated JMS map message in order to reconstruct (step 610) the JMS map message which the first publisher (300) generated. In response, the second transformer (375) passes the reconstructed JMS map message to the third subscriber (370). Subsequently, the data can be used by another application to e.g. display the stock price in a ticker.

Although the principles of the present description have been described in terms of JMS map messages, it should be understood that the apparatus and methods described herein can be implemented with any other types of messages; any other portions of a message (e.g. a header of a message) and other any attributes of a message (e.g. user properties) that may suit a particular application of the principles described herein.

The apparatus and methods described herein allow for a message to be transformed and sent to an entity (e.g. a DDS client) which previously did not recognize the message. Thus, these apparatus and methods allow for improved interoperability between entities.

The apparatus and methods described herein also allow for such a message to be sent without requiring complex and time consuming reconfiguration of the entity. Furthermore, the apparatus and methods described herein allow for such a message to be "published", wherein typically, a publisher does not know who is going to receive the message. The apparatus and methods provide for flexibility at the publisher as the published message can also be received by another entity (e.g. a JMS client) which can also interpret the message.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

The invention claimed is:

1. A method performed by a physical computing device for transforming an original message from an application executed by said physical computing device to create a message readable by a plurality of heterogeneous recipients, said method comprising:
creating with said physical computing device a first sub-message comprising data from said original message that is readable by each of said heterogeneous recipients;
creating with said physical computing device a second sub-message comprising data from said original message that is readable by only some of said heterogeneous recipients; and
generating with said physical computing device a composite message comprising both said first sub-message and said second sub-message.

2. The method of claim 1, in which creating said first sub-message comprises:
placing any portion of said original message that is compatible with each of said heterogeneous recipients into said first sub-message such that said first sub-message is parseable by Message Oriented Middleware (MOM) of each of said heterogeneous recipients.

3. The method of claim 2, in which said original message comprises a first MOM format and said first sub-message comprises a second MOM format that is different from said first MOM format.

4. The method of claim 3, further comprising converting said data that is readable by each of said heterogeneous recipients from said first MOM format to said second MOM format using a schema stored by said physical computing device.

5. The method of claim 4, in which said original message and said second sub-message comprise the same MOM format.

6. The method of claim 1, in which creating said second sub-message comprises:
placing any portion of said original message that is not compatible with each of said heterogeneous recipients into said second sub-message such that said second sub-message is parseable by Message Oriented Middleware (MOM) of at least one of said heterogeneous recipients.

7. The method of claim 1, further comprising transmitting said composite message to each of said heterogeneous recipients.

8. The method of claim 1, in which transmitting said composite message to each of said heterogeneous recipients comprises publishing said composite message as a publish-subscribe message over a network to said heterogeneous recipients.

9. The method of claim 7, in which transmitting said composite message to each of said heterogeneous recipients comprises transmitting said composite message using a data distribution service (DDS).

10. A data processing system, said data processing system comprising:
a processor; and
a memory communicatively coupled to said processor, said memory comprising code executable by said processor to implement a computer application and a Message Oriented Middleware (MOM) interface application;
in which said processor is configured to, responsive Co said computer application producing an original message according to a first MOM format and intended for a plurality of heterogeneous recipients, execute said MOM interface application to:

place any portion of said original message that is compatible with each of said heterogeneous recipients into a first sub-message such that said first sub-message is parseable by MOM of each of said heterogeneous recipients;

place any portion of said original message that is not compatible with each of said heterogeneous recipients into a second sub-message such that said second sub-message is parseable by MOM of at least one of said heterogeneous recipients; and generate a composite message comprising both said first sub-message and said second sub-message.

11. The data processing system of claim 10, in which said first sub-message comprises a second MOM format that is different from said first MOM format.

12. The data processing system of claim 10, in which said processor is further configured to convert said data that is readable by each of said heterogeneous recipients from said first MOM to said second MOM format using a schema stored in said memory.

13. The data processing system of claim 10, in which said second sub-message comprises said first MOM format.

14. The data processing system of claim 10, in which said processor is in communication with said intended recipients through a network.

15. The data processing system of claim 14, in which said processor is further configured to transmit said composite message to each of said intended recipients over said network.

16. The data processing system of claim 15, in which said composite message comprises a publish-subscribe message for which said intended recipients are subscribers.

17. The data processing system of claim 15, in which said MOM interface application comprises:

a transformer module configured to generate said composite message and convert messages received over said network that are not in said first MOM format into said first MOM format;

a transmitter module configured to transmit said composite message to said intended recipients over a network; and a receiver module configured to receive messages from said network.

18. A computer program product for transforming an original message into a message readable by a plurality of heterogeneous recipients; said computer program product comprising:

a computer readable storage device comprising computer readable program code embodied therewith, the computer readable program code comprising:

computer readable program code configured to create a first sub-message comprising data from said original message that is readable by each of said heterogeneous recipients;

computer readable program code configured to create a second sub-message comprising data from said original message that is readable by only some of said heterogeneous recipients;

computer readable program code configured to generate a composite message comprising both said first sub-message and said second sub-message, and computer readable program code configured to transmit said composite message to said intended recipients over a network using a data distribution service (DDS).

19. The computer program product of claim 18, in which said computer readable program code further comprises computer readable program code configured to:

place any said portion of said original message that is compatible with each of said heterogeneous recipients into said first sub-message such that said first sub-message is parseable by Message Oriented Middleware (MOM) of each of said heterogeneous recipients.

20. The computer program product of claim 18, in which said computer readable program code further comprises computer readable program code configured to:

place any portion of said original message that is not compatible with each of said heterogeneous recipients into said second sub-message such that said second sub-message is parseable by Message Oriented Middleware (MOM) of at least one of said heterogeneous recipients.

* * * * *